US010894205B2

(12) United States Patent
Poulus et al.

(10) Patent No.: US 10,894,205 B2
(45) Date of Patent: Jan. 19, 2021

(54) PUZZLE DEVICE

(71) Applicant: Moose Creative Management Pty Limited, Cheltenham (AU)

(72) Inventors: Joost Sebastiaan Poulus, Elsternwick (AU); Nicholas St Clair Max Heine, St Kilda West (AU); James Adam Skaates, San Francisco, CA (US); Vlasta Komorous-King, Berkeley, CA (US); Steven Moore, San Francisco, CA (US); Nikolay Vladimirov, San Francisco, CA (US)

(73) Assignee: Moose Creative Management Pty Limited, Cheltenham (AU)

(*) Notice: Subject to any disclaimer, the term of this patent is extended or adjusted under 35 U.S.C. 154(b) by 272 days.

(21) Appl. No.: 15/697,402

(22) Filed: Sep. 6, 2017

(65) Prior Publication Data

US 2019/0070492 A1  Mar. 7, 2019

(51) Int. Cl.
*A63F 13/214* (2014.01)
*A63F 9/06* (2006.01)
*A63F 9/24* (2006.01)
*A63F 9/08* (2006.01)
*A63F 13/426* (2014.01)
*A63F 7/36* (2006.01)

(52) U.S. Cl.
CPC .......... *A63F 13/214* (2014.09); *A63F 9/0612* (2013.01); *A63F 9/0826* (2013.01); *A63F 9/24* (2013.01); *A63F 13/426* (2014.09); *A63F 2007/3662* (2013.01); *A63F 2009/245* (2013.01); *A63F 2009/2454* (2013.01)

(58) Field of Classification Search
CPC .... A63F 9/0826; A63F 13/426; A63F 9/0612; A63F 13/214; A63F 9/24
See application file for complete search history.

(56) References Cited

U.S. PATENT DOCUMENTS

| 7,731,192 B1 | 6/2010 | Marhefka |
| 2007/0170648 A1 | 7/2007 | Rom |
| 2007/0262522 A1 | 11/2007 | Lu |
| 2009/0031048 A1* | 1/2009 | Richards ............. G06F 13/4072 710/3 |
| 2012/0302303 A1* | 11/2012 | Rosendo ............... A63F 9/0842 463/9 |

* cited by examiner

*Primary Examiner* — Kang Hu
*Assistant Examiner* — Thomas H Henry
(74) *Attorney, Agent, or Firm* — Knobbe Martens Olson & Bear, LLP (57) ABSTRACT

Disclosed are puzzle devices for production of one or more puzzles. The puzzle devices can include a body and at least one input device. The body can include a plurality of panels, each panel configured to display one or more visual indicators. The at least one input device can include a plurality of panels, each panel configured to display a visual indicator. The at least one input device can move relative to the body to align one or more panels of the input device with one or more panels of the body. The body can further include a plurality of visual output devices configured to generate visual indicators on the plurality of panels of the body.

18 Claims, 8 Drawing Sheets

PUZZLE DEVICE

BACKGROUND

Field

This invention relates to toys, and more particularly, relates to toy puzzles.

Description of the Related Art

Puzzles include toys and games that allow a user to solve a problem or reach a desired solution using logic. Some puzzles include multiple components that can be placed together or otherwise positioned to reach a desired orientation. In certain puzzle games, a goal may be to reach a desired solution within a predetermined length of time.

SUMMARY

In certain embodiments, a manipulable puzzle device is disclosed. The puzzle device includes at least one input device connected to a body so as to be movable from a first position to a second position relative to the body. Each of the at least one input device and the body has a plurality of panels. A first panel of the plurality of panels of one of the at least one input device or the body is configured to selectively display a first indicator and a second indicator. A second panel and a third panel of the plurality of panels of the other one of the at least one input device or the body has a third indicator and a fourth indicator, respectively. The first indicator aligns and matches with the third indicator when the at least one input device is in the first position. The second indicator aligns and matches with the fourth indicator when the at least one input device is in the second position. The puzzle device further includes a processor configured to selectively change the first indicator to the second indicator.

In certain embodiments, a manipulable puzzle device is disclosed. The puzzle device includes a body that has a plurality of visual output devices. Each visual output device is configured to selectively display at least two visual indicators. The puzzle device further includes a first input device and a second input device connected to the body so that each of the first and second input devices is separately movable from a first position to a second position relative to the body. Each of the first input device and the second input device has at least two panels. Each panel has a visual indicator. The puzzle device further includes a processor configured to transmit instructions to each visual output device of the plurality of visual output devices to select which of the at least two visual indicators to display. The visual indicator of one of the at least two panels of the first input device and the visual indicator of one of the at least two panels of the second input device aligning and matching with the plurality of visual output devices of the body when the first and second input devices are in the first position and each of the plurality of visual output devices displays a first of the at least two visual indicators. The visual indicator of the other one of the at least two panels of the first input device and the visual indicator of the other one of the at least two panels of the second input device aligns and matches with the plurality of visual output devices of the body when the first and second input devices are in the second position and each of the plurality of visual output devices displays a second of the at least two visual indicators.

In certain embodiments, a manipulable puzzle device is disclosed. The manipulable puzzle device includes a body and a first input device and a second input device connected to the body so that each of the first and second input devices is separately movable from a first position to a second position relative to the body. Each of the first input device and the second input device is telescopically extendable away from the body along a first axis and rotatable about a second axis perpendicular to the first axis.

BRIEF DESCRIPTION OF THE DRAWINGS

The features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will now be described with additional specificity and detail through use of the accompanying drawings.

DETAILED DESCRIPTION

The following detailed description is directed to certain specific embodiments. The invention(s) disclosed herein, however, can be embodied in a multitude of different ways as defined and covered by the claims. In this description, reference is made to the drawings, wherein like parts are designated with like numerals throughout. The features, aspects and advantages of the present invention will now be described with reference to the drawings of several embodiments that are intended to be within the scope of the development herein disclosed. These and other embodiments will become readily apparent to those skilled in the art from the following detailed description of the embodiments having reference to the attached figures, the invention not being limited to any particular embodiment(s) herein disclosed.

Figure 1:
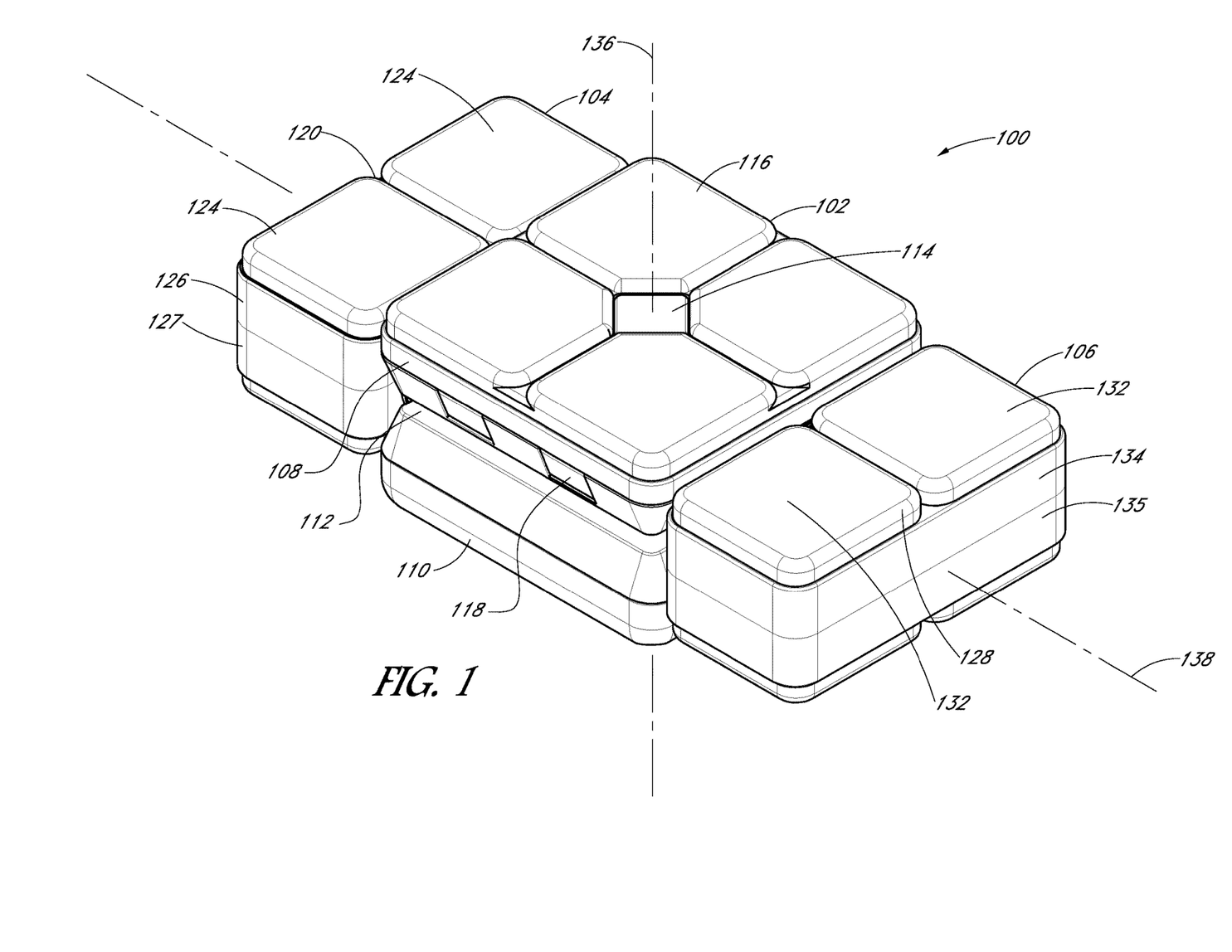
FIG. 1 is a top perspective of a puzzle device according to a preferred embodiment of the present invention.

FIG. 1 illustrates an embodiment of an electronic puzzle device 100. Certain embodiments of the puzzle device 100 include a body 102 and an input device 104. In certain embodiments, the puzzle device 100 can include multiple input devices. In certain embodiments, the input device 104 can be a first input device, and the puzzle device 100 can include a second input device 106.

The body 102 includes a plurality of panels 116. The body 102 can also include a button 114. In certain embodiments, the body 102 includes a top section 108 and a bottom section 110. In certain embodiments, the top section 108 and bottom section 110 are connected near respective center portions of the top section 108 and bottom section 110 so as to form a gap 112 between the top section 108 and bottom section 110 around the periphery of the body 102. In certain embodiments, one or both of the button 114 and plurality of panels 116 can be positioned on a top face of the top section 108. In certain embodiments, the body 102 further includes a plurality of contact plates 118.

As described in further detail herein, the button 114 can be actuated to initiate or control one or more functions of the puzzle device 100. The button 114 can be a depressible electrical button or any other suitable button or trigger.

The body 102 can display or can be actuated to display one or more indicators. In certain embodiments, the body 102 can display or be actuated to display one or more visual indicators. In certain embodiments, the body 102 can display or be actuated to display one or more visual indicators on one or more of the plurality of panels 116. As shown in FIG. 1, the plurality of panels 116 can include four panels. In certain embodiments, each of the panels 116 can display or can be actuated to display a visual indicator or marking, such as a color, a shape, a pattern, a word, or any other suitable visual indicator. In certain embodiments, the plurality of panels can be configured to display four indicators, the first indicator being a blue indicator, the second indicator being a red indicator, the third indicator being a green indicator, the fourth indicator being a yellow indicator. In some embodiments, each panel 116 is transparent or semi-transparent or contains a transparent or semi-transparent section. One or more output devices can be associated with each panel. In certain embodiments, one or more visual output devices, for example, light emitting diodes ("LEDs"), can be associated with each panel 116. The visual output devices associated with each panel 116 can be actuated to produce a color or other visual indicator that can be viewed through the panel 116. As described in further detail herein, a processor can control the visual output devices associated with each panel 116 to produce one or more visual indicators and/or sequences of visual indicators.

The input device 104 includes a plurality of panels 124. In certain embodiments, the plurality of panels 124 are visual display panels. Each panel 124 can display, or can be actuated to display, a visual indicator or marking, such as a color, a shape, a pattern, a word, or any other suitable visual indicator. In some embodiments, each panel 124 is configured to permanently display a particular visual indicator. For example, a visual indicator may be painted on, drawn on, or otherwise affixed to a panel 124. In some embodiments, the visual indicator of a panel 124 can be modified, for example, by activating one or more visual output devices as described with respect to the panels 116. In some embodiments, each panel 124 can display or can be actuated to display a visual indicator that can match or complement a visual indicator of a panel 116. In some embodiments, the plurality of panels 124 can be four panels. In some embodiments, the plurality of panels 124 can include a blue panel, a red panel, a green panel, and a yellow panel.

In certain embodiments, the panels 124 can be arranged about multiple sides or surfaces of the input device 104. In certain embodiments, panels 124 can be arranged on opposite surfaces of the input device 104. In certain embodiments, at least some of the panels 124 can be arranged on a first surface 120. The first surface 120 is shown as a top surface in FIG. 1. As shown in FIG. 1, a pair of panels 124 can be arranged on the first surface 120. In certain embodiments, the first surface 120 can be a surface on a first section 126 of the input device 104. As shown in FIG. 1, the first section 126 can be a top section. In certain embodiments, at least some of the panels 124 can be arranged on a second surface 122. The second surface 122 is shown as a bottom surface in FIG. 1. As shown in FIG. 1, the second surface 122 can include a pair of panels 124. In certain embodiments, the second surface 122 can be a surface on a second section 127 of the input device 104. As shown in FIG. 1, the second section 127 can be a bottom section.

The input device 106 includes a plurality of panels 132. In certain embodiments, the plurality of panels 132 are visual display panels. Each panel 132 can display, or can be actuated to display, a visual indicator or marking, such as a color, a shape, a pattern, a word, or any other suitable visual indicator. In some embodiments, each panel 132 is configured to permanently display a particular visual indicator. For example, a visual indicator may be painted on, drawn on, or otherwise affixed to a panel 132. In some embodiments, the visual indicator of a panel 132 can be modified, for example, by activating one or more visual output devices as described with respect to the panels 116. In some embodiments, each panel 132 can display or can be actuated to display a visual indicator that can match or complement a visual indicator of a panel 116. In some embodiments, the plurality of panels 132 can be four panels. In some embodiments, the plurality of panels 132 can include a blue panel, a red panel, a green panel, and a yellow panel. In certain embodiments, the second surface 132 can be a surface on a second section 135 of the input device 106. As shown in FIG. 1, the second section 135 can be a bottom section.

In certain embodiments, the panels 132 can be arranged about multiple sides or surfaces of the input device 106. In certain embodiments, panels 132 can be arranged on opposite surfaces of the input device 106. In certain embodiments, at least some of the panels 132 can be arranged on a first surface 128. The first surface 128 is shown as a top surface in FIG. 1. As shown in FIG. 1, a pair of panels 132 can be arranged on the first surface 128. In certain embodiments, the first surface 128 can be a surface on a first section 134 of the input device 106. As shown in FIG. 1, the first section 134 can be a top section. In certain embodiments, at least some of the panels 132 can be arranged on a second surface 130. The second surface 130 is shown as a bottom surface in FIG. 1. As shown in FIG. 1, the second surface 130 can include a pair of panels 132.

As described further herein, one or both of the input device 104 and input device 106 can each be movably coupled to the body 102. In certain embodiments, one or both of the input device 104 and the input device 106 can be configured to rotate relative to the body 102. For example, one or both of the input device 104 and input device 106 can be configured to rotate around the periphery of the body 102. In certain embodiments, one or both of the input device 104 and the input device 106 can be configured to rotate about an axis 136. In certain embodiments, one or both of the input device 104 and the input device 106 can be configure to rotate about the body 102 and along the gap 112. In certain embodiments, one or both of the input device 104 and the input device 106 can be configured to rotate in two planes or in more than two planes. In certain embodiments, one or both of the input device 104 and input device 106 can be configured to rotate about an axis 138. In certain embodiments, one or both of the input device 104 and the input device 106 can be configured to translate relative to the body 102. In certain embodiments one or both of the input device 104 and the input device 106 can be configured to translate towards and/or away from the body 102. For example, in certain embodiments, translation of the input device 104 or input device 106 away from the body can facilitate traversal of the input device 104 or input device 106 around a corner of the body 102.

The contact plates 118 can be positioned around one or more surfaces of the body 102. In certain embodiments, the contact plates 118 are positioned around one or more side surfaces of the body 102. In certain embodiments, the contact plates 118 can be positioned around one or more side surfaces of the top section 108. As shown in FIG. 1, the body 102 can include four side surfaces. In some embodiments, each side surface can include at least one contact plate 118. In certain embodiments, each side surface can include two contact plates 118. The plurality of contact plates 118 can be configured to contact pins of one or both of the input devices 104 and 106. As described in further detail herein, in certain embodiments, a processor of the puzzle device 100 can be configured to identify the relative orientation of one or both of the input devices 104 and 106 based on contact between the input device 104 and/or the input device 106 with the contact plates 118.

During use, one or more of the panels 116 can display or can be actuated to display a visual indicator or marking. One or both of the input devices 104 and 106 can be manipulated so that one or more of the panels 124 and/or panels 132 are oriented in a desired position with respect to the panels 116 based on the visual indicators of the panels 116. In certain embodiments, one or both of the input devices 104 and 106 can be rotated about one or more axes so that the one or more of the panels 124 and/or panels 132 are oriented in a desired position with respect to the panels 116. For example, one or both of the input devices 104 and 106 can be rotated about one or both of the axes 136 and 138. In certain embodiments, one or both of the input devices 104 and 106 can be manipulated so that a matching or complementary visual indicator displayed on one of the input devices 104 and 106 is positioned adjacent to a visual indicator displayed by one of the panels 116. In certain embodiments, one or both of the input devices 104 and 106 can be manipulated so that a matching or complementary visual indicator displayed on one of the input devices 104 and 106 is positioned adjacent to each visual indicator displayed by one of the panels 116.

Figure 2:
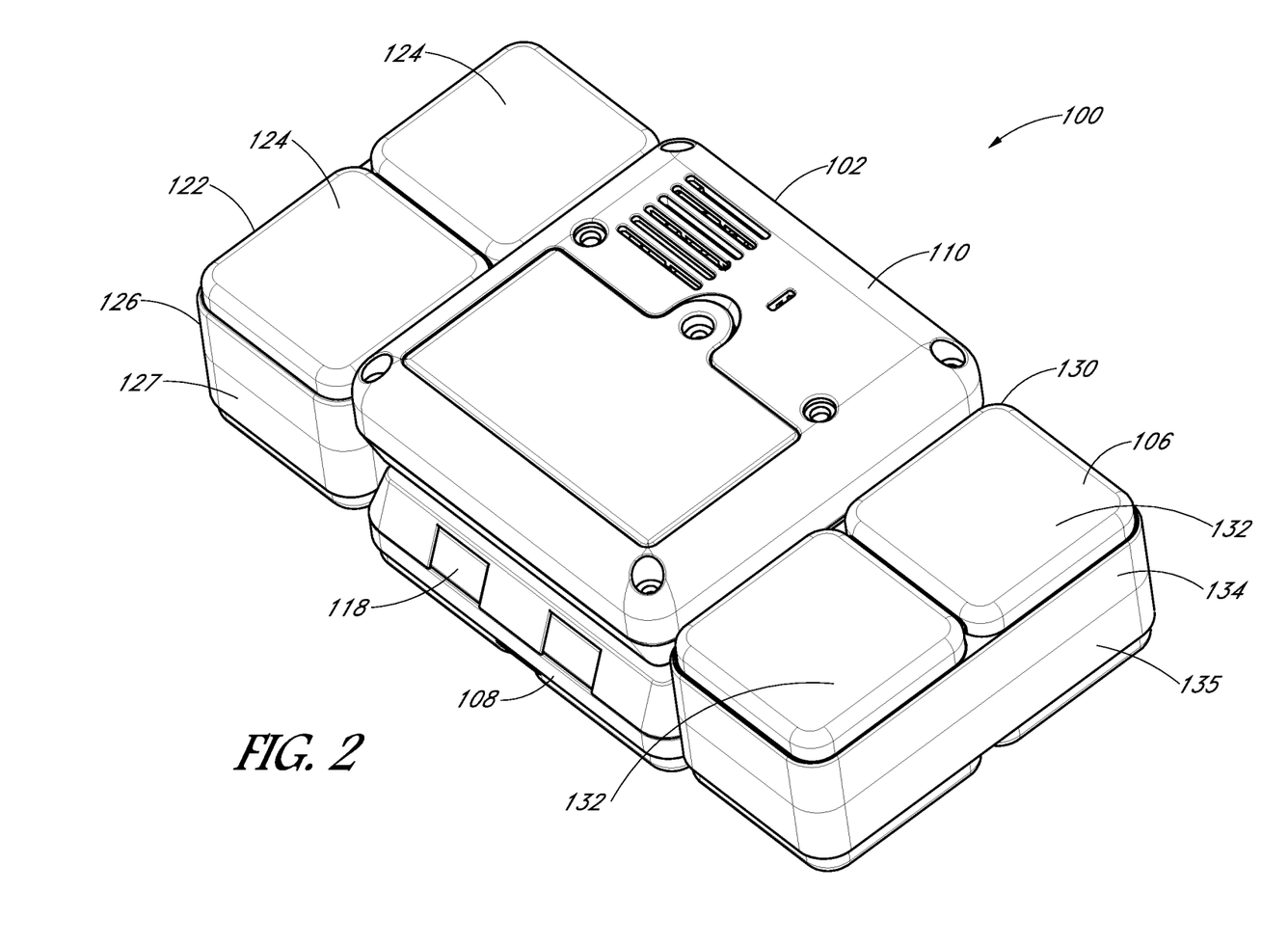
FIG. 2 is a bottom perspective view of the puzzle device of FIG. 1.
Figure 3:
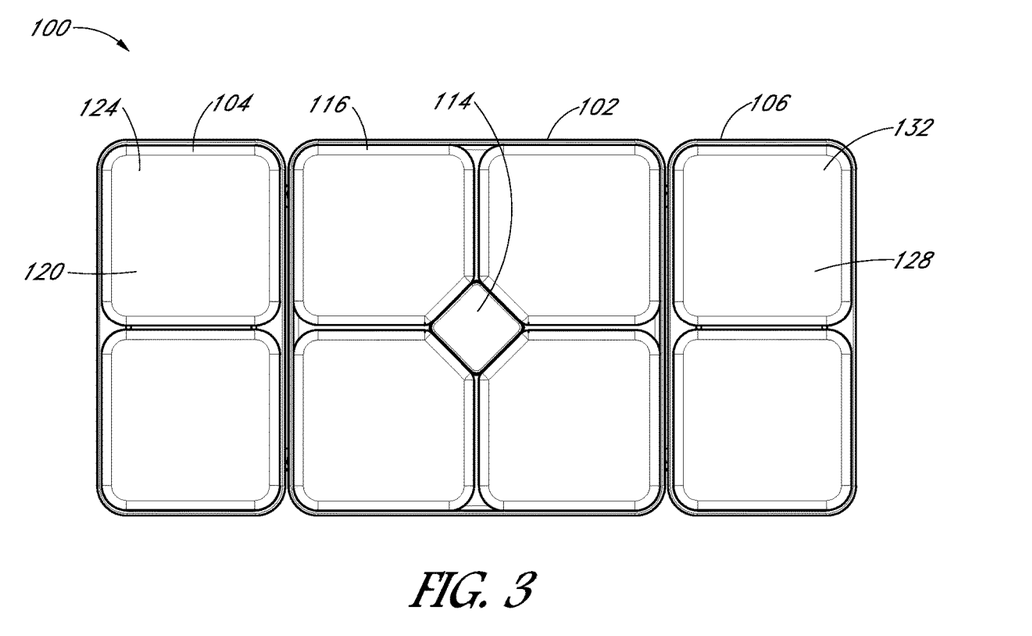
FIG. 3 is a top view of the puzzle device of FIG. 1.
Figure 4:
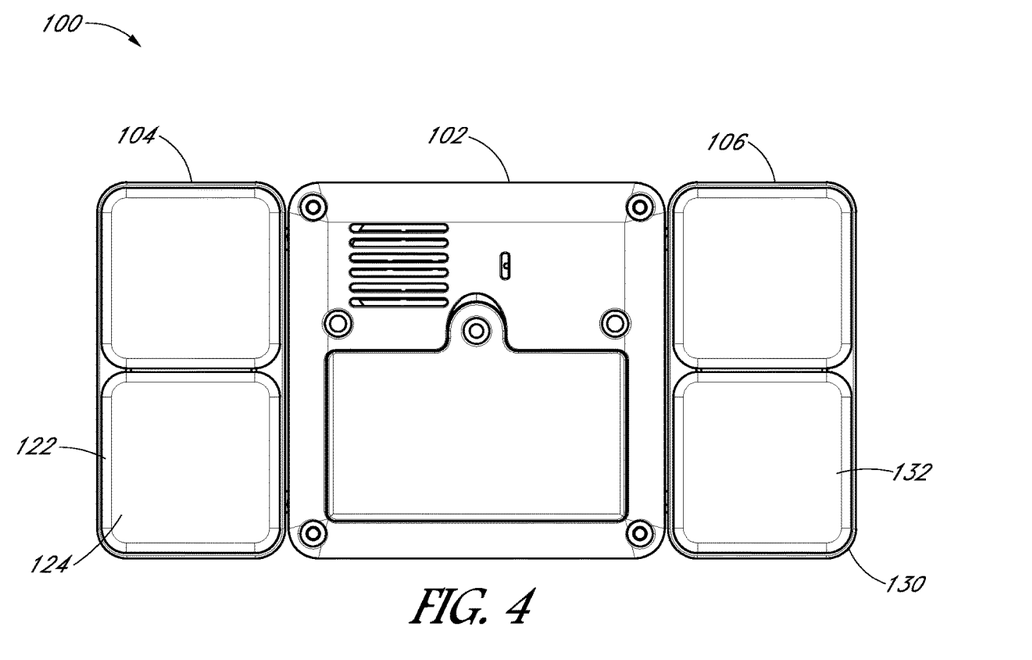
FIG. 4 is a bottom view of the puzzle device of FIG. 1.
Figure 5:
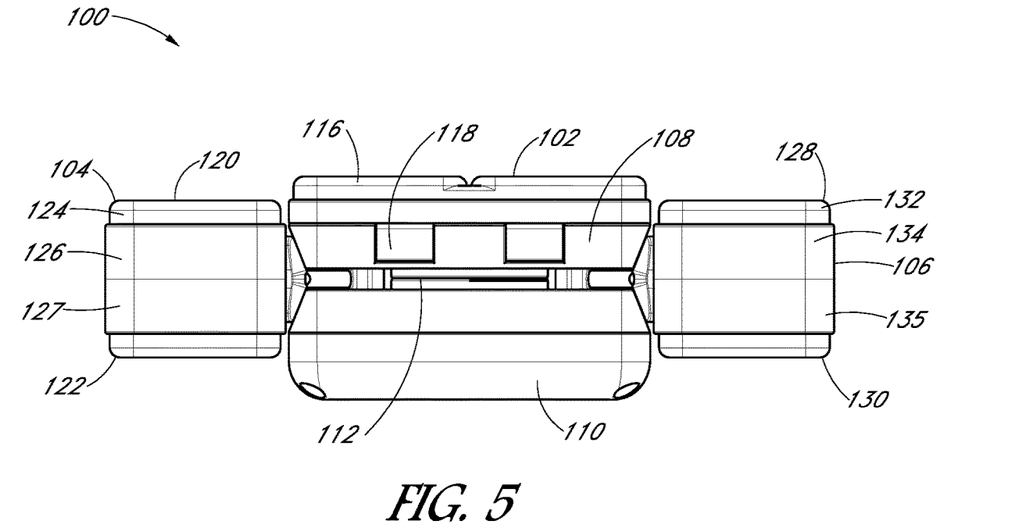
FIG. 5 is a first side view of the puzzle device of FIG. 1.
Figure 6:
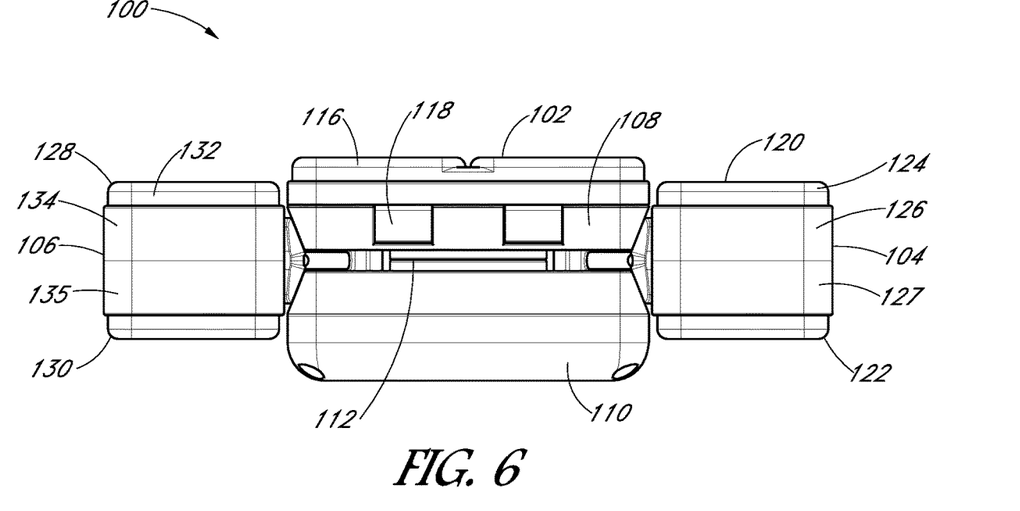
FIG. 6 is a second side view of the puzzle device of FIG. 1.
Figure 7:
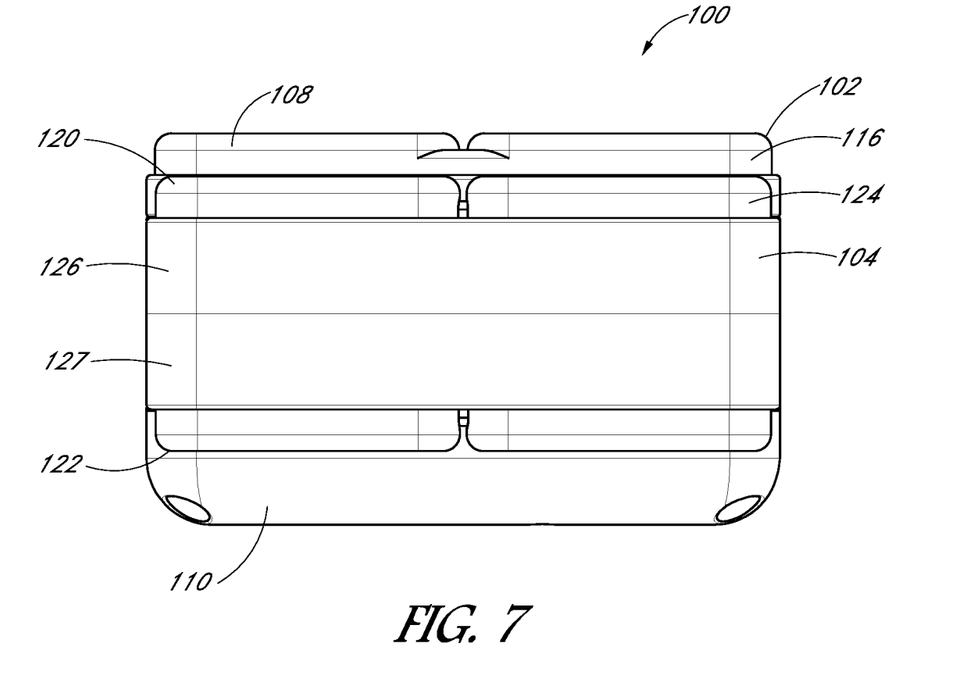
FIG. 7 is a third side view of the puzzle device of FIG. 1.
Figure 8:
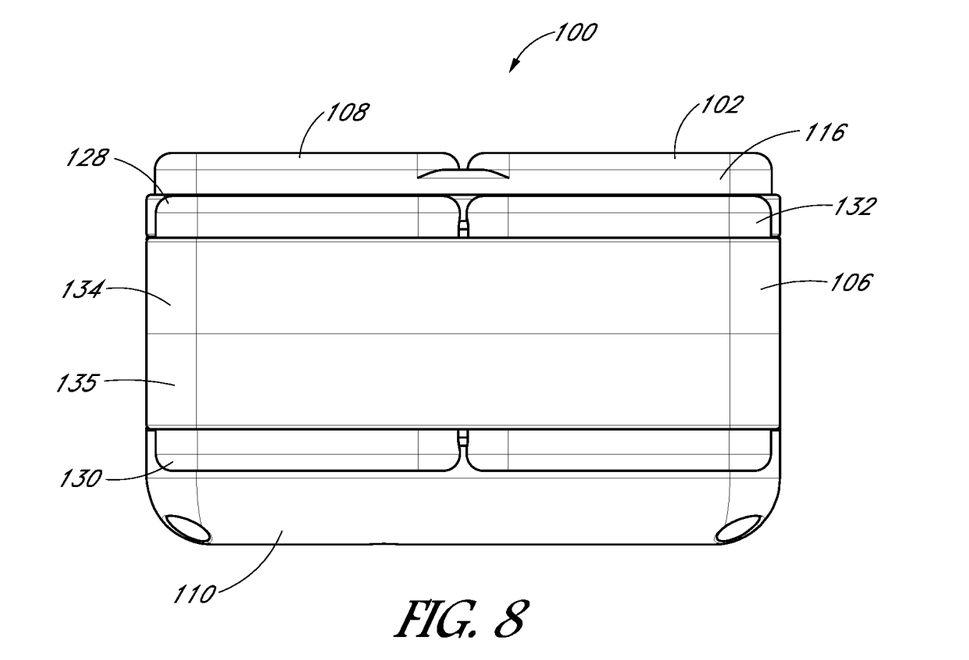
FIG. 8 is a fourth side view of the puzzle device of FIG. 1.

FIGS. 2-8 illustrate the puzzle device 100 from FIG. 1 with the input devices 104 and 106 positioned in the same orientation as shown in FIG. 1. FIG. 2 illustrates a bottom perspective view of the puzzle device 100. FIG. 3 illustrates a top view of the puzzle device 100. FIG. 4 illustrates a bottom view of the puzzle device 100. FIG. 4 illustrates a first side view of the puzzle device 100. FIG. 6 illustrates a second side view of the puzzle device 100. FIG. 7 illustrates a third side view of the puzzle device 100. FIG. 8 illustrates a fourth side view of the puzzle device 100.

Figure 9:
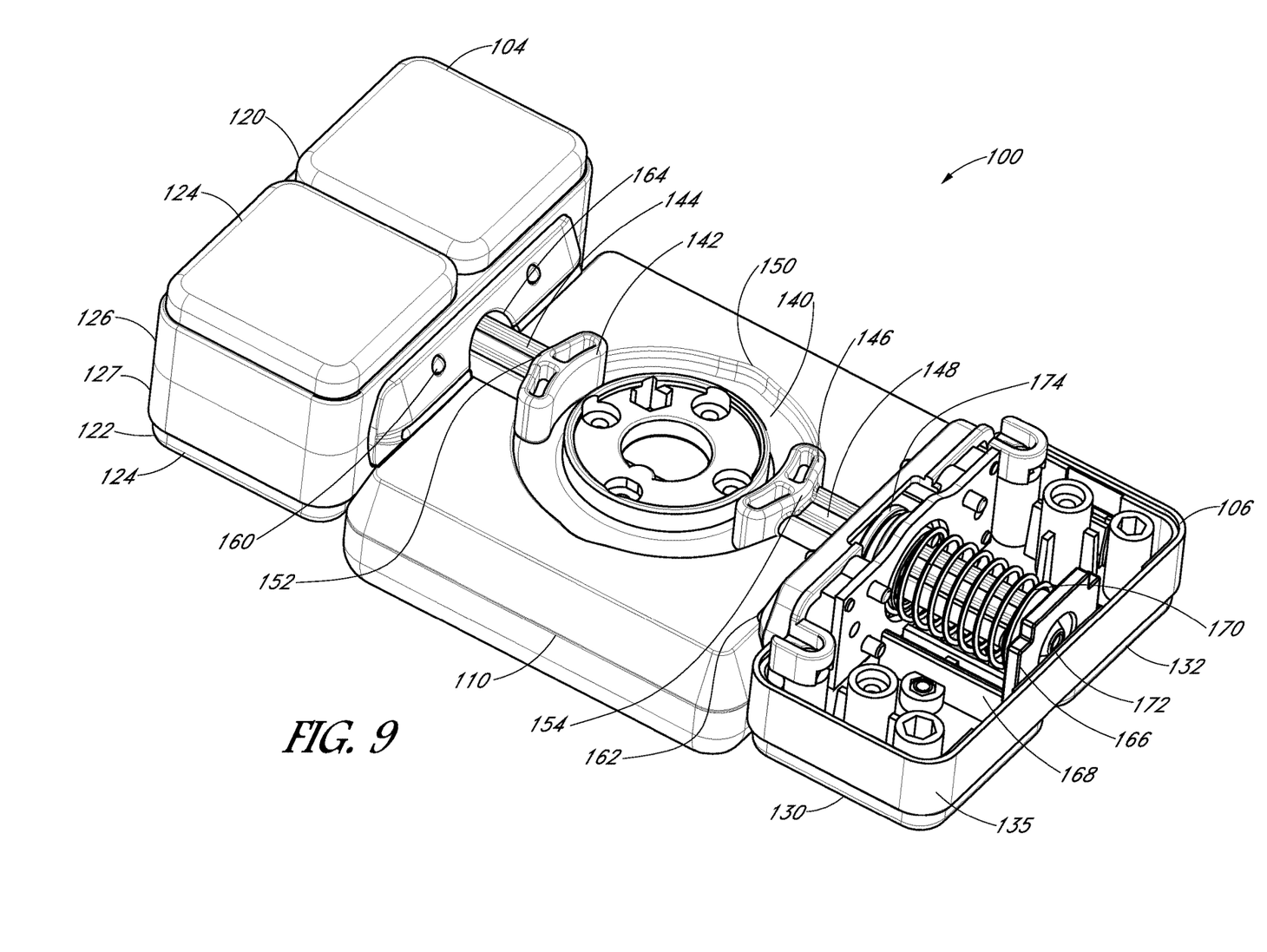
FIG. 9 is a top perspective view of the puzzle device of FIG. 1 in which several sections are removed to show internal features.

FIG. 9 illustrates a top perspective view of the puzzle device 100 with the top section 108 removed and a top section of the second input device 106 removed to show internal features of the body 102 and second input device 106. While the internal features of the first input device 104 are not shown, it should be understood that the internal features of the first input device 104 can be the same as or similar to the internal features of the second input device 106.

As shown in FIG. 9, the first input device 104 can include a plurality of input pins 160. The plurality of pins 160 can be disposed on a surface of the input device 106 that can be aligned with the contact plates 118. In some embodiments, at least some of the pins 160 are disposed on a side surface of the input device 104 facing towards the body 102. In some embodiments, at least some of the pins 160 are disposed on the first section 126 of the input device 104. In some embodiments, a pair of pins 160 are disposed on the first section 126. In some embodiments, at least some of the pins 160 are disposed on the second section 127. In some embodiments, a pair of pins 160 are disposed on the second section 127.

The second input device 106 can include a plurality of pins 162. The pins 162 can include the same or generally the same features and functions as described with respect to the pins 160. FIG. 9 shows a pair of the pins 160 extending from a side surface of the first section 126 of the input device 104 and a pair of the input pins 162 extending from a side surface of the second section 135 of the input device 106. Although not shown, the second section 127 of the input device 104 can include a pair of the pins 160 and the first section 134 of the input device 106 can include a pair of the pins 162. Each pin 160 and/or pin 162 or pair of pins 160 and/or pair of pins 162 can be wired to be separately identifiable by a processor of the puzzle device 100. In some embodiments, each pin 160 and/or pin 162 or pair of pins 160 and/or pair of pins 162 can provide a resistance value different than the other pins 160 and/or pins 162 or pair of pins 160 and/or pair of pins 162. In some embodiments, each of a pair of the pins 160 on the first section 126 of the input device 104, a pair of the pins 160 on the second section 127 of the input device 104, a pair of the pins 162 on the first section 134 of the input device 106, and a pair of the pins 162 on the second section 135 of the input device 106 can provide a different resistance value than each of the other pairs of pins. The different resistance values can allow for a processor of the puzzle device 100 to separately identify each pair of pins 160 and/or pins 162. In certain embodiments, a processor of the puzzle device 100 in connection with the contact plates 118 can determine which pin 160 and/or pin 162, or which pair of pins 160 or pair of pins 162 is contacting a particular contact plate 118 or pair of contact plates 118.

With continued reference to FIG. 9, the puzzle device 100 can further include a track or recess 140. The recess or track 140 can be recessed within the bottom section 110 of the body 102. In some embodiments, the track 140 is positioned within a top surface of the bottom section 110 of the body 102. In certain embodiments, the track extends about the axis 136. In certain embodiments, the track forms a circle within body 102. The first input device 104 is coupled to a moving member 142 positioned within the track 140. In certain embodiments, the moving member 142 is a t-section boss. In certain embodiments, the input device 104 is connected to the moving member 142 via a shaft 144. The second input device 106 is coupled to a moving member 146 positioned within the track 140. In some embodiments, the moving member 146 is a t-section boss. In certain embodiments, the input device 106 is coupled to the moving member 146 via a shaft 148. One or both of the moving members 142 and 146 can move within the track 140. In certain embodiments, one or both of the moving members 142 and 146 can slide within the track 140. In certain embodiments, one or both of the moving members 142 and 146 can move within the track 140 to allow for rotation of the first input device 104 and/or second input device 106 around the periphery of the body 102. In certain embodiments, one or both of the moving members 142 and 146 can move within the track 140 to allow for rotation of the first input device 104 and/or the second input device 106 about axis 136.

The track 140 can include a plurality of engagement members 150. The moving member 142 and moving member 146 can include engagement members 152 and 154, respectively, shaped to engage one of the engagement members 150. The engagement members 152 and 154 can have a complementary shape with respect to the engagement members 150 to facilitate alignment of the engagement members 152 and 154 with the engagement members 150 when the moving members 142 and 146 move about the track 140. The engagement members 150 and engagement members 152 and 154 can be positioned such that alignment of the engagement members 150 and engagement members 152 and 154 causes alignment of the pins 160 and 162 of the input devices 106 and 108, respectively. In certain embodiments, the engagement members 150 can be detents. In certain embodiments, the engagement members 150 can be disposed about a peripheral portion of the track 140. In certain embodiments, four engagement members 150 are positioned about the track 140. In certain embodiments, the engagement members 152 and 154 are protrusions.

With continued reference to FIG. 9, the input device 104 includes an opening 164. The shaft 144 can extend through the opening 164 into an interior section of the input device 104. While not shown, it should be understood that the input device 106 can include a similar opening through which the shaft 148 extends. The input device 106 can further includes a guide plate 166 and guide ribs 168. Although only a single guide rib 168 is shown, the input device 106 can include a plurality of guide ribs 168. In certain embodiments, the input device 106 can include a pair of guide ribs 168 positioned within the first section 134. In certain embodiments, the input device 106 can include a pair of guide ribs in the second section 135.

The shaft 148 can extend through a channel of the guide plate 166. In certain embodiments, the guide plate 166 can be configured to rotate about the shaft 148. In certain embodiments, rotation of the guide plate 166 about the shaft 148 can facilitate rotation of the input device 106 about a longitudinal axis of the shaft 148. In certain embodiments, rotation of the guide plate 166 about the shaft 148 can facilitate rotation of the input device 106 about the axis 138. In certain embodiments, a distal end 172 of the shaft 148 can have a larger cross-section than the channel of the guide plate 166 through which the shaft extends. In certain embodiments, a portion of the guide plate 166 can act as a washer with respect to a distal end 172 of the shaft 148.

The guide plate 166 and guide ribs 168 are movably engaged to one another. In some embodiments, the guide plate 166 slidably engages the guide ribs 168. In certain embodiments, the guide plate 166 can translate along the guide ribs 168. In certain embodiments, the guide ribs 168 can translate with respect to the guide plate 166. In certain embodiments, the sliding engagement between the guide plate 166 and guide ribs 168 can allow the input device 106 to translate with respect to the guide plate 166 towards or away from the central body 102 along the axis 138.

FIG. 9 depicts the input device 106 in a position in which the input device 106 abuts the body 102. In certain embodiments, the input device 106 can be translated away from the body 102 to create a gap between the input device 106 and the body 102. The gap between the input device 106 and body 102 can provide space for the input device 106 to traverse the corners of the body 102. The input device 106 can further include a spring 170. In certain embodiments, the spring 170 can be a compression spring. The spring 170 can be configured to bias the input device 106 towards the body 102. In other words, the spring 170 can be configured to bias the input device 106 towards a position in which the pins 162 contact the contact plates 118. In some embodiments, a first end of the spring 170 can be configured to abut the guide plate 166. A second end of the spring 170 can be configured to abut a surface 174 of the input device 106. In some embodiments, relative movement of the input device 106 away from the body 102 can cause the spring 170 to compress between the guide plate 166 and the surface 174. If the input device 106 is released, the spring 170 retracts the shaft 148 within the input device 106.

Figure 10:
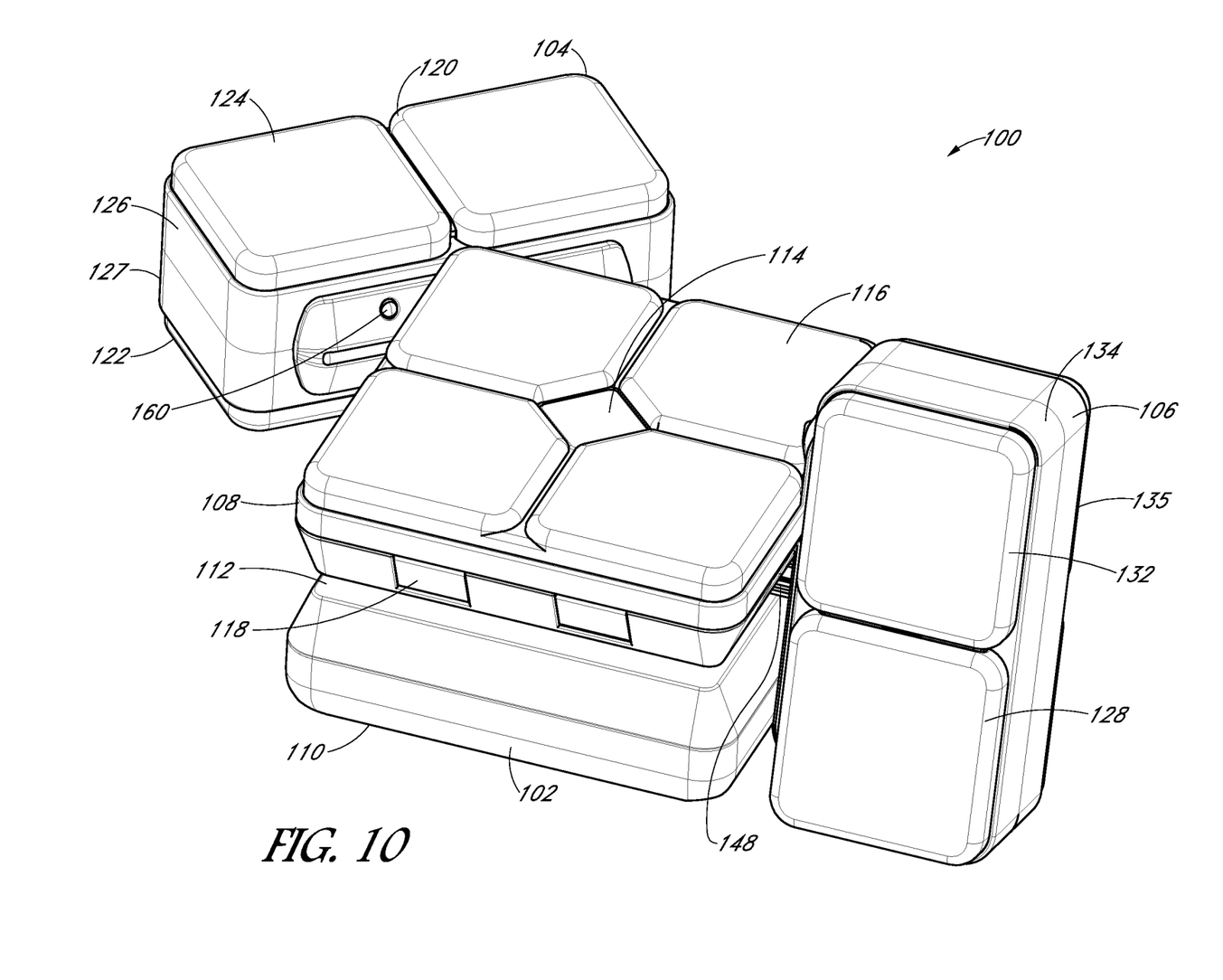
FIG. 10 is a top perspective view of the puzzle device of FIG. 1 in which several components are shown in a different orientation in comparison to FIG. 1.

FIG. 10 depicts a perspective view of the puzzle device 100 showing the input device 104 and the input device 106 in orientations along examples of rotational paths of the input devices 104 and 106 relative to the body 102. The input device 104 is shown in partially rotated about the axis 136 in comparison to the position of the input device 104 as shown in FIG. 1. The input device 106 is shown in a partially rotated about the axis 138 in comparison to the position of the input device 106 as shown in FIG. 1.

Figure 11:
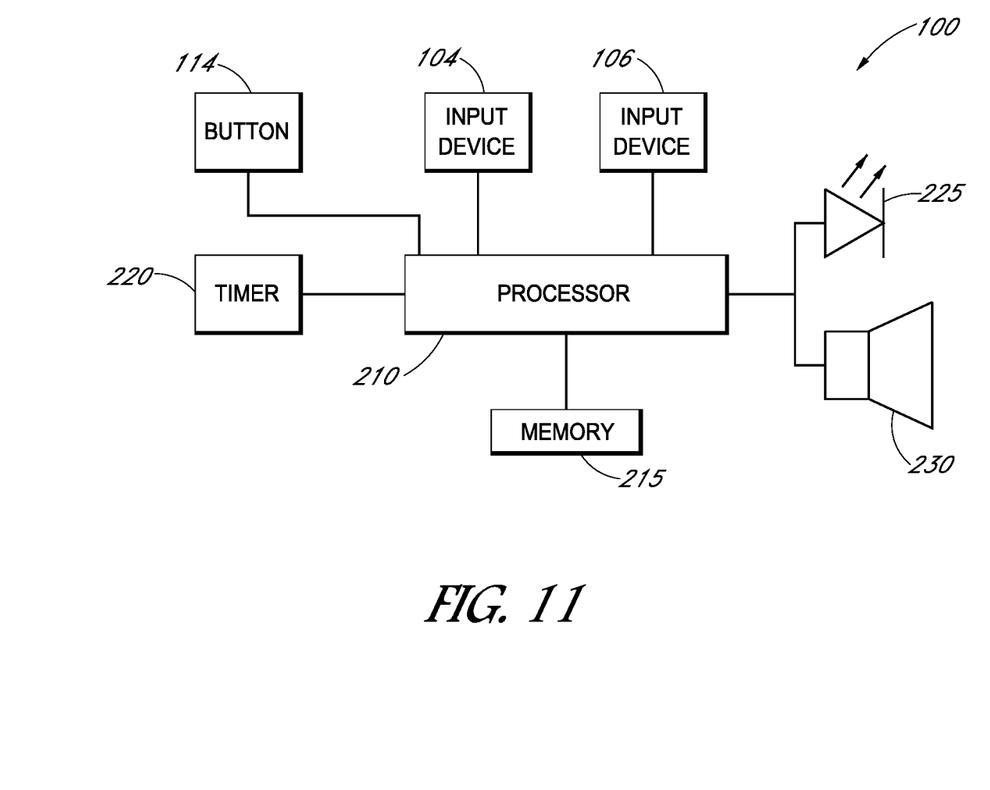
FIG. 11 is a schematic view of the puzzle device of FIG. 1.

FIG. 11 depicts a schematic view of the puzzle device 100. FIG. 100 shows the input devices 104 and 106 and the button 114. In certain embodiments, the puzzle device 100 further includes a processor 210. In certain embodiments, the puzzle device 100 further includes a memory 215. In certain embodiments, the puzzle device 100 further includes a timer 220. In certain embodiments, the puzzle device 100 further includes a plurality of visual output devices 225. In certain embodiments, the puzzle device 100 further includes a speaker 230. In certain embodiments, one or more of the processor 210, the memory 215, the timer 220, and the speaker are positioned within the body 102.

The processor 210 can be in communication with one or more of the input device 104, the input device 106, the button 114, the memory 215, the timer 220, the visual output devices 225, and the speaker 230. The processor 210 can control operations of one or more of the timer 220, the visual output devices 225, and the speaker 230. The processor 210 may perform logical and arithmetic operations based on program instructions stored within the memory 215. The memory 215, which may include both read-only memory (ROM) and random access memory (RAM), can provide instructions and data to the processor 210. A portion of the memory 215 may also include non-volatile random access memory (NVRAM). The instructions in the memory 215 may be executable to implement the processes described herein.

The processor 210 can be configured to receive and process data from the input devices 104 and 106. As described herein, the processor 210 can be configured to determine a relative position of one or both of the input device 104 and the input device 106 based on contact of the input device 104 with a pair of contact plates 118 and/or contact between the input device 106 with a pair of contact plates 118. The processor 210 can determine a relative position of one or both of the input devices 104 and the input device 106 about a periphery of the body 102 based at least in part on which contact plates 118 are being contacted. In certain embodiments, the processor 210 can determine a relative position of one or both the input devices 104 and 106 based on measured resistance values at the contact plates 118 being contacted. As described herein, each input device 104 can include a pair of pins 160 disposed on a first section 126 and a pair of pins 160 disposed on a second section 127. Each pair of pins 160 can provide a unique resistance value that can act as an identifier when in contact with the contact plates 118. In certain embodiments, each input device 106 can include a pair of pins 162 disposed on a first section 134 and a pair of pins 162 disposed on a second section 135. In certain embodiments, the processor 210 can further determine the orientation of the first and second surfaces (first surfaces 122 and 128, second surfaces 124 and 130) of the input devices 104 and 106 based on the measured resistance value at a contacted pair of contact plates 118. Information determined by the processor 210 can be stored in the memory 215. The memory 215 can also include information regarding the resistance values of each pair of contact pins 160 and 162. In certain embodiments, the memory can include information regarding the relative positions of various features of the input devices 104 and 106 when a pair of contact pins 160 or 162 is in contact with a pair of contact plates 118.

Although determination of the relative positions of one or both of the input devices 104 and 106 is described with respect to contact plates 118 and pins 160, various alternative mechanisms can be employed for determining the relative positions of one or both of the input devices 104 and 106. For example, in certain embodiments, one or both of the input devices 104 and 106 can include one or more detents positioned on one or more surfaces of the input devices 104 and 106. In some embodiments, the body 102 can include one or more switches configured to be actuated by the detents of the input devices 104 and 106. For example, in some embodiments, each side surface of the body 102 can include one or more switches configured to be actuated by the detents of the input device 104 and/or input device 106. In some embodiments, the one or more detents of the input device 104 and/or input device 106 can be arranged so that different switches are activated in response to different positions of the input device 104 and/or input device 106. In some embodiments, the one or more switches of the body 102 can be arranged so that different switches are activated in response to different positions of the input device 104 and/or input device 106. In some embodiments, the first section 126 of the input device 104 can have a different amount and/or different configuration of detents in comparison to the second section 127 of the input device 104. In some embodiments, the first section 134 of the input device 106 can have a different amount and/or different configuration of detents in comparison to the second section 135 of the input device 106. In some embodiments, the input device 104 can have a different amount and/or different configuration of detents in comparison to the input device 106. In some embodiments, each of the first section 126 of the input device 104, the second section 127 of the input device 104, the first section 134 of the input device 106, and the second section 135 of the input device 106 can have a different amount and/or different configuration of detents. In some embodiments, each side surface of the body 102 can include a different amount and/or different configuration of switches. In some embodiments, a side surface can have a different amount and/or different configuration of switches on the top section 108 in comparison to the bottom section 110. In some embodiments, the processor 210 can be configured to receive and process data from the one or more switches to determine the relative position of one or both of the input devices 104 and 106.

In some embodiments, one or both of the input devices 104 and 106 can include one or more magnets. In some embodiments, the body 102 can include one or more magnetic sensors. In some embodiments, the body 102 can include one or more magnetic sensors on each of the side surfaces of the body 102. In some embodiments, the one or more magnets of the input devices 104 and/or 106 can be arranged so that different magnetic sensors are activated in response to different positions of the input device 104 and/or input device 106. In some embodiments, the one or more magnetic sensors of the body 102 can be arranged so that different magnetic sensors are activated in response to different positions of the input device 104 and/or input device 106. In some embodiments, the first section 126 of the input device 104 can have a different amount and/or different configuration of magnets in comparison to the second section 127 of the input device 104. In some embodiments, the first section 134 of the input device 106 can have a different amount and/or different configuration of magnets in comparison to the second section 135 of the input device 106. In some embodiments, the input device 104 can have a different amount and/or different configuration of magnets in comparison to the input device 106. In some embodiments, each of the first section 126 of the input device 104, the second section 127 of the input device 104, the first section 134 of the input device 106, and the second section 135 of the input device 106 can have a different amount and/or different configuration of magnets. In some embodiments, different configurations of magnets include different polarities of magnets. In some embodiments, each side surface of the body 102 can include a different amount and/or different configuration of magnetic sensors. In some embodiments, a side surface can have a different amount and/or different configuration of magnetic sensors on the top section 108 in comparison to the bottom section 110. In some embodiments, one or both of the input device 104 and the input device 106 can include a single magnet offset from a center of the input device 104 and/or the input device 106. In some embodiments, one or both of the input device 104 and the input device 106 can include a first magnet on the first section 126 and/or first section 134 and a second magnet on the second section 127 and/or second section 135 offset from the first magnet so that the first magnet and second magnet are configured to align with different magnetic sensors of the body 102. In some embodiments, one or more of the magnetic sensors are Hall sensors. In some embodiments, the processor 210 can be configured to receive and process data from the one or more magnetic sensors to determine the relative position of one or both of the input devices 104 and 106.

The processor 210 can also be configured to receive and process data from the button 114. In certain embodiments, the processor 210 can be programmed to activate the puzzle device 100 in response to actuation of the button 114. In certain embodiments, the processor 210 can be programmed to deactivate the puzzle device 100 in response to actuation of the button 114. In certain embodiments, the puzzle device 100 can be programmed to select a mode of operation of the puzzle device 100 in response to actuation of the button 114.

The processor 210 can also configured to provide instructions to activate one or more of the visual output devices 225. One or more of the visual output devices 225 can be associated with each of the panels 116. In certain embodiments, one or more of the visual output devices 225 can be LEDs. In certain embodiments, the processor can actuate the visual output devices 225 to display one or more visual indicators on one or more of the panels 116. For example, the processor 210 can activate the visual output devices 225 to produce predefined colors on one or more of the panels 116. In some embodiments, the processor 225 can activate the visual output devices 225 to produce a predefined series or pattern of colors on or more of the panels 116.

The processor 210 can also be configured to provide instructions to actuate the speaker 230 to produce one or more audible outputs. The audible outputs can include musical sounds and voice instructions. The memory 215 can store data related to voice instructions and musical sounds that can be generated during use of the puzzle device 100.

The processor 210 can be configured to retrieve the data related to voice instruction and musical sounds from the memory 215. In certain embodiments, the processor 210 can be configured to actuate the speaker 230 to produce predetermined audible outputs in response to particular events related to use of the puzzle device 100. Examples of such particular events can include activation of the puzzle device 100, movement of one of the input devices 104 and 106, initiation of a puzzle game, initiation of a puzzle mode, completion of a puzzle, and failure of a puzzle. In certain embodiments, the processor 210 can be configured to actuate the speaker 230 to produce different audible outputs for different movements of the input devices 104 and 106. For example, in certain embodiments, the processor 210 can be configured to actuate the speaker 230 to produce a first audible output in response to a rotation of one of the input devices 104 and 106 about a first axis, such as axis 136, and a second audible output in response to rotation about a second axis, such as axis 138.

In certain embodiments, the processor 210 can be configured to activate one or more of the output devices 225 to produce one or more predetermined visual indicators on the panels 116 in response to one or more particular events related to use of the puzzle device 100. In certain embodiments, the processor 210 can be configured to activate one or more of the output devices 225 to produce a predetermined pulse animation in response to one or more particular events. Examples of such particular events can include activation of the puzzle device 100, movement of one of the input devices 104 and 106, initiation of a puzzle game, initiation of a puzzle mode, completion of a puzzle, and failure of a puzzle. In certain embodiments, a predetermined pulse animation includes a sequential series or pattern of one or more visual indicators on the display panels 116. In certain embodiments, the predetermined pulse animation is a predetermined LED pulse animation.

The processor 210 can also be configured to provide instructions to and receive data from the timer 220. In certain embodiments, the timer 220 can provide time measurements correlated with the use of the puzzle device 100. In certain embodiments, the processor 210 can determine an amount of time between events during use of the puzzle device 100 based on information received from the timer 220. In certain embodiments, the processor 210 can determine a total duration of use of the puzzle device 100 in a session of use based on information received from the timer 220. In certain embodiments, the processor 210 can determine a duration of time for completion of a puzzle. In certain embodiments, the processor 210 can determine a duration of time for completion of a series of puzzles, for example, as part of a puzzle game or level of a puzzle game. In certain embodiments, the processor 210 can determine a duration of time for a movement of one of the input devices 104 and 106.

In certain embodiments, the memory 215 can store instructions for the generation of a plurality of puzzles. For example, the memory 215 can include a look up table providing a list of possible puzzles. In certain embodiments, the instructions for the generation of the plurality of puzzles can be executed by the processor 210. In some embodiments, the processor 210 is configured to retrieve instructions for the generation of a puzzle from the memory 215 and to execute the instructions in response to a signal received from one or more of the button 114, the input device 104, and the input device 106.

A puzzle can include one or more visual indicators, such as colors, displayed on one or more of the panels 116. In certain embodiments, a plurality of visual indicators can be displayed concurrently on a plurality of the panels 116. A puzzle can also include a series or pattern of visual indicators displayed on one or more panels 116. A series or pattern of visual indicators can include a plurality of visual indicators in which at least some of the visual indicators are displayed sequentially one or more of the panels 116. In some embodiments, a series or pattern of visual indicators can include at least some visual indicators displayed concurrently on a plurality of panels 116 and at least some visual indicators displayed sequentially on one or more of the panels 116.

In certain embodiments, a puzzle may be considered to be solved when a matching or complementary visual indicator displayed on one of the input devices 104 and 106 is positioned adjacent to each visual indicator displayed by the panels 116. In certain embodiments, the memory 215 can store data related to the visual indicators displayed on each of the panels 124 and 132. In certain embodiments, the processor 210 can determine when a puzzle is solved by determining the relative positions of one or both of the input devices 104 and 106 with respect to the body 102. In certain embodiments, the processor 210 can determine the relative position of at least some of the visual indicators on the panels 124 and/or 132 with respect to the body 102, for example, based on the determination of the relative positions of one or both of the input devices 104 and 106 with respect to the body 102. In certain embodiments, the processor 210 can compare the positions of at least some of the visual indicators on the panels 124 and/or 132 to the visual indicators of the panels 116 to determine when a puzzle is solved. In certain embodiments, the processor compares the positions of the at least some of the visual indicators on the panels 124 and/or 132 to the visual indicators of the display panes 116 to determine when a matching or complementary visual indicator is displayed on one of the input devices 104 and 106 adjacent to each visual indicator displayed by the panels 116. In certain embodiments, the processor can be configured to actuate the speaker 230 to produce a predetermined audible output and/or activate the visual output devices 225 to produce a predetermined visual output in response to determination of a solution of a puzzle.

In certain embodiments, the processor 210 is configured to activate the timer 220 when a puzzle is generated. In certain embodiments, the processor 210 is configured to determine a length of time between generation of a puzzle and completion of a puzzle. In certain embodiments, the processor 210 is configured to associate a time limit with a puzzle. The processor 210 in conjunction with the timer 220 can determine when a time limit associated with a puzzle has been reached. In certain embodiments, if the processor 210 does not determine that the puzzle has been solved, within the time limit, the processor 210 can be configured to determine a failure of the puzzle. In some embodiments, in response to determination of a failure of a puzzle, the processor 210 can be configured to activate the speaker 230 to produce an error sound. In some embodiments, in response to determination of a failure of a puzzle, the processor 210 can be configured to activate one or more of the visual output devices 225 to produce one or more visual indicators on the panels 116 indicating an error, for example, a predetermined pulse animation.

In some embodiments, the processor 210 is configured to detect changes in orientation of one or both of the first input device 104 and second input device 106. For example, the processor 210 can determine each time a different contact pin/contact plate 118 engagement occurs. In certain embodiments, each time a different contact pin/contact plate engagement occurs can be characterized as a "game move." The processor 210 can be configured to determine a number of game moves for a puzzle or series of puzzles. In certain embodiments, the memory 215 can store data related to a number of game moves. In certain embodiments, if the processor 210 does not determine that a puzzle or series of puzzles has been solved within a predetermined number of game moves, the processor 210 can be configured to determine a failure of the puzzle. In certain embodiments, in response to determination of a failure of a puzzle, the processor 210 can be configured to activate the speaker 230 to produce an error sound. In some embodiments, in response to determination of a failure of a puzzle, the processor 210 can be configured to activate one or more of the visual outputs 225 to produce one or more visual indicators on the panels 116 indicating an error, for example, a predetermined pulse animation.

In certain embodiments, the memory 215 can store instructions for a plurality of different puzzle game modes. In some embodiments, the processor can be configured to determine a puzzle game mode in response to signals received from one or both of the input devices 104 and 106. For example, in some embodiments, a game mode can be selected by rotating one of the input devices 104 and 106 about the axis 138. In some embodiments, the processor 210 can determine a selected game mode based on the number of times the input device 104 or 106 rotates 180° about the axis 138. As described herein, the processor 210 can determine the number of 180° rotations of the input device 104 or 106 based on a determination of a different contact pin/contact plate 118 engagements.

In some embodiments, the memory 215 can store instructions for a "Speed Mode" puzzle game mode. In the Speed Mode, a user may be prompted to solve a predetermined number of puzzles as fast as possible. In some embodiments, every time a puzzle is solved, a new puzzle is generated until the final puzzle of the predetermined number of puzzles is solved. In certain embodiments, the timer 220 can measure the amount of time between the initiation of the Speed Mode and the time at which the final puzzle of the predetermined number of puzzles is solved. In response to the final puzzle of the predetermined number of puzzles being solved, the processor 210 can provide instructions to the speaker 230 to provide an audible indication of the amount of time between the initiation of the Speed Mode and the time at which the final puzzle is solved.

In some embodiments, the memory 215 can store instructions for a "Level Mode" puzzle game mode. In the Level Mode, a series or set of one or more puzzles can be considered a level. Each puzzle in a level can be provided to a user consecutively. If each puzzle in a level is solved, the level can be considered complete. If a level of puzzles is completed, a new level of puzzles can be initiated. For example, after a first level of puzzles is completed, a second level of puzzles can be generated, after the second level of puzzles is completed, a third level of puzzles can be generated, and so on. In some embodiments, each level of puzzles is associated with a time limit for solving each puzzle in the level. In some embodiments, the time limit associated with each puzzle in a level can decrease between levels as further levels of puzzles are generated. In certain embodiments, a total time limit for each level is provided. In some embodiments, the total time limit associated with each level can decrease between levels as further levels of puzzles are generated. The memory 215 can store data related to the number of puzzles solved and/or the number of levels completed. In some embodiments, the Level Mode may terminate upon failure of a puzzle or in response to an input from a user. Upon termination of the Level Mode, the processor can provide instructions to the speaker 230 to provide an audible indication of the number of puzzles solved.

In some embodiments, the memory 215 can store instructions for a "Memory Mode" puzzle game mode. In the Memory Mode, each puzzle can consist of a sequence of flashing visual indicators displayed. In certain embodiments, at least some visual indicators are in the sequence of flashing visual indicators are displayed for a predetermined amount of time and then terminated prior to display of additional visual indicators. After the sequence of flashing visual indicators has completed, the puzzle can be solved by aligning visual indicators of input devices 104 and 106 with corresponding or matching panels 116 of the body in the order in which the sequence of flashing visual indicators occurred.

In some embodiments, the memory 215 can store instructions for a "Multiplayer Mode" puzzle game mode. In certain embodiments of the Multiplayer Mode, the processor 210 can be configured to activate the speaker 230 to provide an audible indication of a number of puzzles to be solved by a user in a single gameplay turn of the user. In certain embodiments, the processor 210 can determine that the number of puzzles in the single gameplay turn are solved. In response to determining that the number of puzzles in the single gameplay turn are solved, the processor 210 can activate the speaker 230 to provide an audible indication that the puzzle device should be provided to a new user. In certain embodiments, the processor 210 can activate the visual output devices 225 to provide one or more visual indicators that the puzzle device 100 should be passed to a new user, for example, a predetermined pulse animation. In certain embodiments, the processor 210 can activate the speaker 230 to provide an audible indication of a number of puzzles to be solved by the new user in a single gameplay turn. This process can be repeated until a failure occurs. In certain embodiments a failure can be determined to occur if puzzle or set of puzzles is not solved within a predetermined time limit or a predetermined number of game moves. In some embodiments, the processor 210 in conjunction with the timer 220 is configured to associate a total time limit with the Multiplayer Mode. When the total time limit is reached, the processor 210 can activate the speaker to provide an audible indication that the Multiplayer Mode is complete. In some embodiments, the processor 210 can activate the visual output devices 225 to provide a visual indication that the Multiplayer Mode is complete, for example a predetermined pulse animation. In certain embodiments, the user holding the puzzle device 100 when the Multiplayer Mode is complete can be considered a losing player of the Multiplayer Mode.

While the above detailed description has shown, described, and pointed out novel features of the development as applied to various embodiments, it will be understood that various omissions, substitutions, and changes in the form and details of the devices illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

The above description discloses several methods of manufacture and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A manipulable puzzle device comprising:
   an input device connected to a body so as to be movable from a first position to a second position relative to the body, each of the input device and the body having a plurality of panels, a first panel of the plurality of panels of one of the input device or the body being configured to selectively display a first indicator and a second indicator, a second panel and a third panel of the plurality of panels of the other one of the input device or the body having a third indicator and a fourth indicator, respectively, the first indicator aligning and matching with the third indicator when the input device is in the first position, the second indicator aligning and matching with the fourth indicator when the input device is in the second position; and
   a processor configured to selectively change the first indicator to the second indicator,
   wherein the input device is coupled to the body so as to be rotatable in two planes without rotating the body, and wherein the input device and the body define at least one of the two planes.

2. The manipulable puzzle device of claim 1, wherein the body comprises the first panel of the plurality of panels, and the input device comprises the second panel and the third panel.

3. The manipulable puzzle device of claim 1, further comprising a second input device, the second input device being movably connected to the body and independently movable relative to the first input device.

4. The manipulable puzzle device of claim 3, wherein the second input device comprises a fourth panel and a fifth panel of the plurality of panels.

5. The manipulable puzzle device of claim 1, wherein the first panel is configured to selectively display four indicators, the first indicator being a blue indicator, the second indicator being a red indicator, a third indicator being a green indicator, and a fourth indicator being a yellow indicator, and wherein the processor is further configured to selectively change the first panel to the first indicator, the second indicator, the third indicator, and the fourth indicator.

6. The manipulable puzzle device of claim 1, wherein the processor is further configured to determine when the input device is in the first position and when the input device is in the second position.

7. The manipulable puzzle device of claim 6, further comprising a timer in communication with the processor, wherein the processor is configured to determine that the input device is not positioned in the second position within a predetermined duration of time following selectively display of the second indicator.

8. The manipulable puzzle device of claim 6, wherein the body comprises one or more contact plates, wherein the input device comprises one or more pins, wherein the processor is configured to determine when the input device is in the first position and when the input device is in the second position based at least in part on contact between at least one of the one or more contact plates and at least one of the one or more pins.

9. The manipulable puzzle device of claim 8, wherein the input device comprises a plurality of pairs of pins, each pair of pins configured to provide a unique resistance value relative to the other pairs of pins.

10. The manipulable puzzle device of claim 1, wherein the processor is further configured to determine movement of the input device from the first position to the second position.

11. The manipulable puzzle device of claim 1, wherein the input device is coupled to the body via a shaft, wherein the input device is rotatable about a longitudinal axis of the shaft.

12. The manipulable puzzle device of claim 11, wherein the input device is translatable in a direction away from the body along the shaft.

13. The manipulable puzzle device of claim 1, wherein the at least one of the two planes passes through a periphery of the body.

14. A manipulable puzzle device comprising:
a body having a periphery and a plurality of visual output devices disposed within the periphery, each visual output device configured to selectively display at least two visual indicators;
a first input device and a second input device, each of the first input device and the second input device being connected to the body via a shaft so as to be separately movable along the periphery while rotating about a longitudinal axis of the shaft from a first position to a second position without rotating the body, each of the first input device and the second input device having at least two panels, each panel having a visual indicator; and
a processor configured to transmit instructions to each visual output device of the plurality of visual output devices to select which of the at least two visual indicators to display, the visual indicator of one of the at least two panels of the first input device and the visual indicator of one of the at least two panels of the second input device aligning and matching with the plurality of visual output devices of the body when the first and second input devices are in the first position and each of the plurality of visual output devices displays a first of the at least two visual indicators, the visual indicator of the other one of the at least two panels of the first input device and the visual indicator of the other one of the at least two panels of the second input device aligning and matching with the plurality of visual output devices of the body when the first and second input devices are in the second position and each of the plurality of visual output devices displays a second of the at least two visual indicators.

15. The manipulable puzzle device of claim 14, wherein one of the at least two panels of the first input device is positioned on a first side of the first input device and the other one of the at least two panels of the first input device is positioned on a second side of the first input device, wherein one of the at least two panels of the second input device is positioned on a first side of the second input device and the other one of the at least two panels of the second input device is positioned on a second side of the second input device.

16. The manipulable puzzle device of claim 14, wherein the processor is configured to transmit instructions to the plurality of visual output devices to display a sequence of the at least two visual indicators.

17. The manipulable puzzle device of claim 14, wherein the processor is further configured to determine that the visual indicator of one of the at least two panels of the first input device and the visual indicator of one of the at least two panels of the second input device aligns and matches with the plurality of visual output devices of the body.

18. The manipulable puzzle device of claim 14, wherein the body comprises a plurality of contact plates, wherein the first input device comprises at least one pin and the second input device comprises at least one pin, the at least one pin of the first input device being distinguishable from the at least one pin of the second input device by the processor when the at least one pin of the first input device is in contact with one of the plurality of contact plates and the at least one pin of the second input device is in contact with one of the plurality of contact plates.

* * * * *